United States Patent [19]

Douglas

[11] 3,877,047
[45] Apr. 8, 1975

[54] FOLDING CAMERA AND BELLOWS
[75] Inventor: Lawrence M. Douglas, South Easton, Mass.
[73] Assignee: Polaroid Corporation, Cambridge, Mass.
[22] Filed: Dec. 28, 1973
[21] Appl. No.: 429,022

[52] U.S. Cl. ................................ 354/158; 354/193
[51] Int. Cl. .......................................... G03b 17/04
[58] Field of Search .......... 354/187, 158, 193, 192, 354/194, 189

[56] References Cited
UNITED STATES PATENTS
1,851,095  3/1932  Gosselin............................ 354/193
3,678,831  7/1972  Baker............................... 354/158 X
3,682,068  8/1972  Stieger............................. 354/187
3,706,267  12/1972  Harvey............................. 354/187

Primary Examiner—John M. Horan
Attorney, Agent, or Firm—John S. Vale

[57] ABSTRACT

A folding camera which features a low cost, collapsible and erectable bellows for excluding extraneous light from the camera's optical path. The bellows is formed from a single, flat, pre-shaped blank of flexible light opaque material. The bellows includes a retaining plate for attaching its leading end to a movable camera housing section. By its shape, the retaining plate directs tension forces, applied to the bellows as the camera is folded, along predetermined lines to establish fold lines along which the bellows folds to assume its collapsed position.

39 Claims, 11 Drawing Figures

FOLDING CAMERA AND BELLOWS

BACKGROUND OF THE INVENTION

1. Field of the Invention

The present invention relates to the field of photography and, more particularly, to compact folding cameras that include a collapsible and erectable light-excluding bellows.

2. Description of the Prior Art

The prior art is replete with numerous folding cameras that employ an erectable or extensible bellows to enclose and exclude extraneous or ambient light from the optical path between the camera's objective lens and the film support when the camera is erected.

There are certain bellows design, manufacturing and economic characteristics that are highly desirable. For example, the bellows should collapse along predetermined fold lines and occupy an absolute minimum of space in the folded condition.

When erected, the bellows or light excluding walls of the bellows must be dimensionally stable so as not to intrude into the camera's optical path or interfere with a fixed or movable mechanism (e.g., a reflex mirror) enclosed by or adjacent to the erected walls of the bellows.

Cycle life is extremely important. The bellows must be able to withstand thousands of cycles of movement between its collapsed and erected states and maintain its dimension stability when extended and faithfully fold on its predetermined lines when collapsed. More importantly, throughout its cycle life, the bellows must remain light-tight and not develop pin holes or light-transmitting cracks along the fold lines or in areas of stress such as its points of connection to the main camera housing.

From a manufacturing and cost standpoint, the choice of bellows becomes a difficult one. The material should be relatively inexpensive; easy to use in terms of the manufacturing techniques employed to establish the fold lines; it should not take a "set" after long periods of remaining in either the collapsed or erected state and thereby impairing its ability to be folded or maintain its dimensional stability; and it should be able to meet its design criteria while operating in relatively cold and hot temperatures.

There are also certain desirable features that make a folding camera employing a bellows easier and more enjoyable to use. For example, the bellows should be automatically erected and collapsed when the user extends and folds the camera housing or body. That is, the user should not have to go through a two-step process of (1) extending the camera body and then (2) erecting and latching the bellows, or (1) unlatching and partially or fully collapsing the bellows and then (2) folding the camera body.

U.S. Pat. No. 3,678,831, issued to James G. Baker on July 25, 1972 and assigned to the same assignee as the present invention, discloses a compact, folding, reflex camera of the "self-developing type".

The foldable housing includes four sections pivotally interconnected in a four-bar linkage for movement between a compact folded position and an extended position wherein the four sections are spaced from one another. The space between the four erected sections is enclosed by an extensible molded rubber bellows which excludes extraneous light from an optical path that traverses the space between the erected housing sections. Appropriate openings are provided in the bellows to allow light transmission between the objective lens, a reflex viewing device, and the film exposure plane.

While the bellows functions extremely well, it does not meet the criteria for low cost and ease of manufacture. For one thing, the bellows is complex in shape (an irregular hexahedron) and is molded with a wall thickness of 0.008 inches. The bellows wall includes a plurality of integrally molded fold lines which permits the side and forward walls of the bellows to fold accordian style when the housing is moved to its folded position.

In order to fold easily and occupy an absolute minimum of space when collapsed, the walls of the rubber bellows are extremely thin. This in itself makes the bellows difficult and expensive to mold. The major manufacturing cost is attributable to the complex shape of the bellows. Molding is accomplished by injecting rubber between superposed male and female mold sections that define the shape of a partially erected bellows. The spacing of the mold sections is critical because of the requirement to form very thin walls. More importantly, this manufacturing technique does not readily lend itself to high speed and automated techniques. The bellows are formed one at a time and volume manufacturing is obtained by adding more moldings and injection machines.

As disclosed in the previously mentioned U.S. Pat. No. 3,678,831, the folded bellows occupies a thin space between superposed folded housing sections of the camera. When folded, it also must arrange itself around a movable reflex member normally positioned in overlying relationship to the camera's film exposure plane. When the camera is erected, the walls are extended and assume a substantially planar configuration to provide internal clearance for movement of the reflex member. Thus it is desirable to have the bellows walls stretch slightly when erected to assume their planar configuration. However, the stretch must be controlled so that the bellows walls do not exert a significant compression force on the camera housing what may distort the shape of the erected camera or make it difficult for the user to bring the camera to its fully extended configuration.

The present invention provides a bellows that meets both the performance criteria and low manufacturing cost. Basically, it comprises a flat sheet of flexible material which may be folded into the complex shape and joined along opposite edges to form the bellows.

The prior art discloses bellows which are formed from one or more sheets of flexible material (See U.S. Pat. Nos. 3,375,767 and 3,706,267). However, the prior art bellows of this type generally requires that predetermined fold lines (or members which define fold lines) be molded or pressed in during the manufacturing process. This, in turn, requires a complicated and costly manufacture step. Close manufacturing tolerances must be maintained so that the bellows walls match that camera housing to which it will be coupled.

SUMMARY OF THE INVENTION

The present invention provides a folding camera of the type described which features a novel and low cost collapsible and erectable light excluding bellows.

The bellows is formed from a single, flat, pre-shaped, blank of flexible light opaque material which, when mating edges thereof are joined together, may be assembled into the required complex shape.

To the blank are attached certain retainers for coupling the bellows to the movable sections of the camera.

Fold lines are established by one such retainer which has a predetermined shape for directing tension forces, applied to the bellows by sections of the camera as it is folded, along predetermined lines to establish the fold lines.

The use of an inexpensive blank of flexible material substantially reduces the materials cost in relation to a molded rubber bellows. The assembly technique of adding retainers and other members to the flat blank before the bellows assumes its final form, readily lends itself to a highly automated, high production rate process, again providing a significant manufacturing cost reduction.

In a preferred embodiment, the camera includes four housing sections interconnected in a four bar linkage for movement between a folded position and an extended position wherein the four housing sections define a space therebetween.

An exposure system, including an optical system, is provided for exposing a film unit adapted to be located in the first housing section. The optical system includes an objective lens, mounted on the second housing section; a mirror, mounted on the third housing section; a reflex member movably mounted on the first housing section; and a viewing device mounted on the fourth housing section which cooperate to define a folded optical path within the space defined by the extended housing sections for viewing and exposure modes of operation.

The bellows is configured to enclose the optical paths, in cooperation with the extended housing sections, and is coupled to the first, second, and third housing sections by retainers.

As the camera is folded, the first and second housing sections induce tension forces on the bellows. The pre-shaped retainer, coupling the leading end of the bellows to the second housing section, directs the tension forces along predetermined lines of a forward section and side walls of the bellows to establish fold lines. The first and third housing sections simultaneously apply a compressive force to the bellows to fold it along the fold lines. Because of this structure, the novel bellows does not require molded fold lines, stiffening panels for defining fold lines, or permanent creases.

In a preferred embodiment, the pre-shaped blank is formed of a rubberized woven cloth. Also, the retainer coupling the bellows to the third housing section includes means for movably mounting the mirror to provide sufficient storage space between the mirror and reflex member for the collapsed bellows.

Therefore it is an object of the present invention to provide a folding camera which features a novel, low-cost light-excluding bellows.

It is another object to provide a bellows which may be folded by inducing and directing tension forces along predetermined lines of the bellows.

It is yet another object to provide such a bellows which may be formed from a single, flat, preshaped blank of flexible light-opaque material.

Other objects of the invention will in part be obvious and will in part appear hereinafter.

BRIEF DESCRIPTION OF THE DRAWINGS

The novel features that are considered characteristic of the invention are set forth with particularity in the appended claims. The invention itself, however, both as to its structure and its operation together with the additional objects, features and advantages thereof will be best understood from the following description of the preferred embodiment when read in connection with the accompanying drawings wherein:

DESCRIPTION OF THE PREFERRED EMBODIMENT

Figure 1:
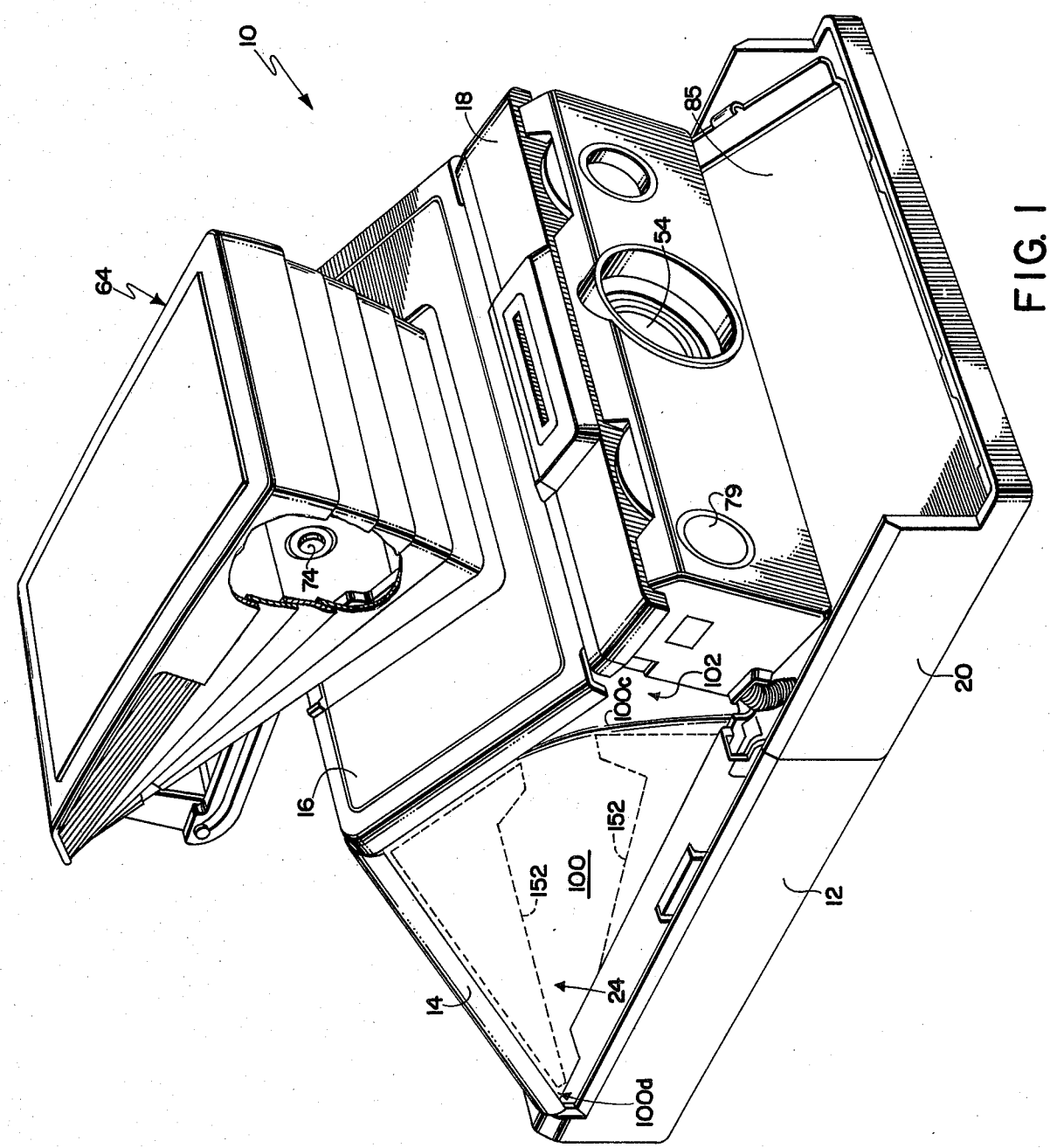
FIG. 1 is a perspective view of a folding, single-lens reflex camera having a light excluding bellows embodying the present invention, said camera being shown in an extended operative position.
Figure 2:
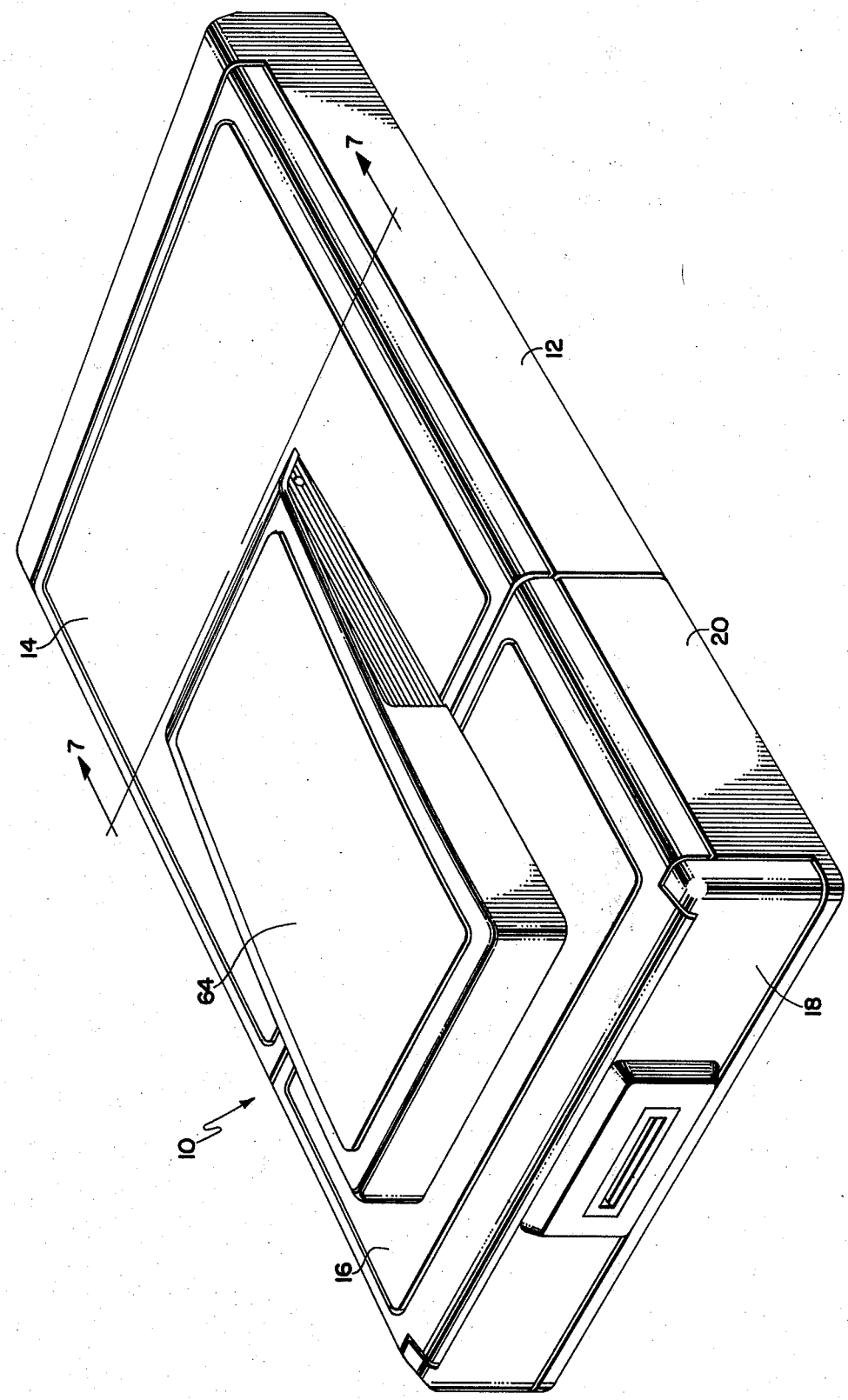
FIG. 2 is a perspective view of the camera of FIG. 1 shown in a compact folded position.
Figure 3:
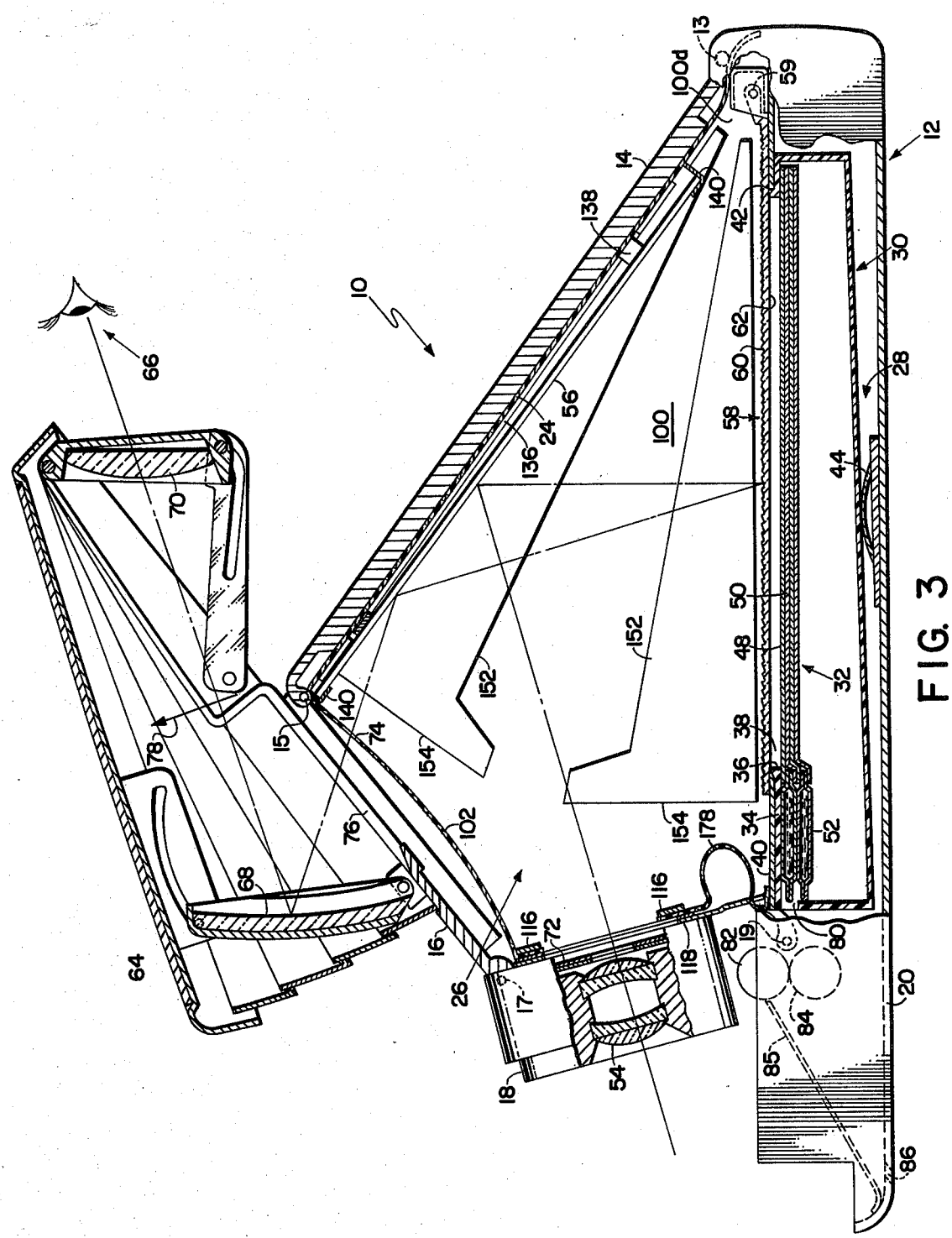
FIG. 3 is a side, elevational view, partly in section, of the camera shown in FIG. 1.

Referring now to the drawings, a compact, folding, single lens reflex camera 10 of the self-developing type is shown in its extended operative position in FIGS. 1 and 3 and its folded compact position in FIG. 2. Camera 10 includes a variable geometry housing formed by five rigid housing sections. Sections 12, 14, 16, and 18 are pivotally interconnected at pivot points 13, 15, 17, and 19 to form a movable four-bar linkage, and section 20 is pivotally coupled to one end of housing section 12.

The four-bar linkage structure permits the geometry of the housing to be converted from the folded inoperative configuration shown in FIG. 2 to the extended operative configuration by rotating housing section 14 in a clockwise direction about pivot 13 (as viewed in FIG. 3) until an erecting link (not shown) coupled between sections 12 and 14 automatically locks to releasably secure the camera in the extended position. Secured to the interior surfaces of housing sections 12, 14, and 18 is a foldable, opaque, envelope or bellows 24 which is automatically unfolded in response to moving the variable geometry housing to the extended position and cooperates with sections 12, 14, 16, and 18 to provide a lighttight exposure chamber 26 within the bounds of the four-bar linkage. The bellows 24 will be described in detail hereinafter.

The first housing section 12 includes a chamber 28 for receiving a film container 30 preloaded with a plurality of film units 32 arranged in stacked relation therein. Access for loading film container 30 into receiving chamber 28 is provided by rotating housing section 20 downwardly in a counterclockwise direction (as viewed in FIG. 3) to expose an open end of chamber 28 located near the interface between housing sections 12 and 20.

Film container 30 includes a forward wall 34 having an upstanding rib 36 which defines the bounds of a generally rectangular light-transmitting section or aperture 38 through which actinic radiation is adapted to pass to expose the forwardmost film unit 32. Film container 30 is supported within chamber 28, at its forward wall 34, by a plate-like support frame 40 having a rectangular opening 42 therein providing communication with the exposure aperture 38 of the film container 30. The forward wall 34 of the film container is securely held against support frame 40 by means of a support spring 44 secured to the interior surface of the bottom wall of housing section 12 and adapted to engage a rear wall 46 of the film container.

Film unit 32 preferably is an integral unit comprising a plurality of superposed layers (including photosensitive and image-receiving layers) and a supply of fluid processing composition that is adapted to be distributed, subsequent to exposure, between a predetermined pair of layers to initiate a development and diffusion transfer process. The film unit 32 is diagrammatically illustrated as including upper and lower superposed elements 48 and 50 and a rupturable container 52 at one end of elements 48 and 50 holding the supply of fluid processing composition. It will be understood that the interface between the elements 48 and 50 is meant to represent the interface between a predetermined pair of layers in film unit 32.

A more detailed description of film unit 32 may be found in U.S. Pat. No. 3,415,644 issued to E. H. Land on Dec. 10, 1968.

The camera's optical system includes an objective lens 54, mounted in housing section 18, for forming an image of the scene to be photographed; a planar mirror 56, coupled to an interior wall of housing section 14, for reflecting light passing through objective lens 54 towards the exposure plane; and a plate-like reflex member 58, pivotally coupled to housing section 12 at pivot 59 for movement between a viewing and focusing position, shown in FIG. 3, and an exposure position adjacent to and parallel with the fixed planar mirror 56. Reflex member 58 has a viewing surface or focusing screen 60 on one side for displaying the image formed by objective lens 54 via reflection from planar mirror 56, and a planar reflective surface 62 on the other side, the function of which will be described hereinafter. The optical system further includes a foldable viewing device 64 for viewing the image displayed on focusing screen 60 from an eye station 66. The optical portion of viewing device 64 is formed by a curved mirror 68, and eye lens 70 and an entrance pupil or aperture 74 formed in bellows 24.

Camera 10, being of the single lens reflex type, is configured to operate first in a viewing and focusing mode of operation and thereafter in an exposure and processing mode. As best seen in FIG. 3, during the viewing and focusing mode of operation, reflux member 58 rests atop support frame 40 and light-seals opening 42 and the film container exposure aperture 38. A normally open shutter 72, mounted between objective lens 54 and an opening in bellows 24, permits light to pass through the lens 54 and across chamber 26 until it impinges upon mirror 56 which is positioned by housing section 14 to reflect the light onto the focusing screen 60 to form an image of the scene to be photographed. Focusing screen 60 may take the form of an echelon type mirror as diagrammatically illustrated in FIG. 3. Light emanating from the image on focusing screen 60 is reflected upwardly toward planar mirror 56 from which it is reflected toward housing section 16. The light then passes through the small aperture 74 in bellows 24 which defines the entrance pupil for the viewing device 64 and then through a larger aperture 76 in housing section 16 until it impinges upon curved mirror 68. Mirror 68 has a concave ellipsoidal shaped reflective surface which reflects the light rearwardly toward eye station 66 and forms a real, erect, and unreverted aerial image designated by a vertical arrow 78. The eye lens 70 serves to magnify the image at 78 to facilitate viewing and focusing from the eye station 66.

In operation, the photographer views the aerial image 78 through eye lens 70 while adjusting objective lens 54 until it is in sharp focus. Once the image is in sharp focus, the photographer actuates a shutter release button 79 (See FIG. 1) on housing section 18 which is operative to initiate the following sequence of operations. First, the normally opened shutter 72 closes and reflex member 58 is pivoted upwardly about pivot 59 to the exposure position adjacent to and parallel with the fixed mirror 56. A blocking member (not shown) attached to the movable end of reflex member 58 blocks the entrance pupil 74 of viewing device 64 thereby causing exposure chamber 26 to assume a light-tight condition. Shutter 72 is then opened to admit light into exposure chamber 26. The light is reflected from the planar reflecting surface 62 on the underside of reflex member 58 onto the forwardmost film unit 32 thereby causing exposure of the film unit. After an appropriate exposure interval, the shutter again closes and reflex member 58 is pivoted downwardly to its viewing and focusing position. Once reflex member 58 caps opening 42 and the exposure aperture 38 in the forward wall 34 of the film container, shutter 72 is opened and the optical system assumes its viewing and focusing mode.

As reflex member 58 is being returned to its viewing and focusing position, the exposed forwardmost film unit is automatically advanced, by means not shown, forwardly through a withdrawal slot 80 in the leading end wall of film container 30 and into engagement with a pair of pressure applying rollers 82 and 84 mounted in housing section 20. Rollers 82 and 84 are adapted to be rotatably driven (by a camera mounted motor and drive train, not shown) in a direction to advance the exposed film unit 32 therebetween toward the exterior of camera 10. As the exposed film unit passes between rollers 82 and 84, they apply compressive pressure to the film unit which causes pod 52 to rupture and dispense the processing fluid which is then uniformly distributed between the predetermined pair of layers to initiate the diffusion transfer process. A light shield 85, in front of the rollers, deflects the film unit downward and it exits from the camera through an opening 86 in the bottom wall of camera housing section 20.

The preceding has been a brief description of the structure and operation of folding reflex camera 10 to provide the necessary background for a description of the novel low cost collapsible and erectable bellows 24.

As described earlier, the low cost bellows 24 of the present invention is intended to replace the hollow, thin walled, molded rubber bellows described in U.S.

Pat. No. 3,678,831. Rather than molding the bellows to its final shape, the novel low cost bellows 24 is initially cut or stamped to form a pre-shaped blank from a single sheet of flat, flexible, light-opaque material. After the addition of certain internal members to the pre-shaped blank for coupling the bellows 24 to the camera housing and other members for providing a predetermined shape when the bellows is erected, the flat bellows is folded or formed and certain mating edges are bonded together.

One analogy to the method of construction is the making of cloth garments. The individual sections of the garment are reduced to flat patterns or templates for cutting the cloth sections which are then sewn together. However, in this application, a complex shaped bellows 24 (see FIGS. 6 and 8) has been reduced to a single, pre-shaped planar pattern, requiring only forming and then joining certain mating edges to form the final bellows.

In a preferred embodiment of the invention, the starting blank is cut or stamped from a thin, flexible and light-opaque material such as a rubberized woven fabric. One suitable material is a woven cotton coated with neoprene rubber, said coated fabric having a nominal thickness of 8 mils. It will be understood that other fibers and light-opaque coatings may be used as alternatives.

Figure 6:
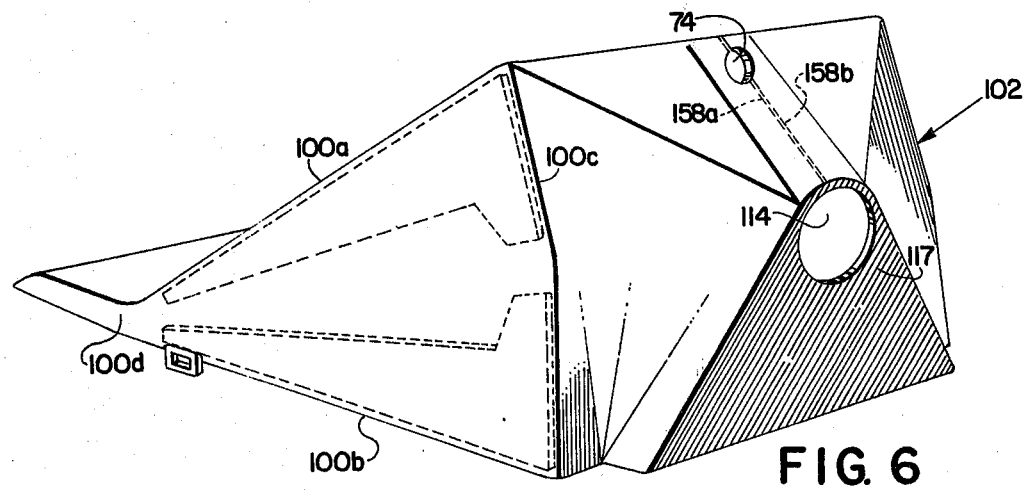
FIG. 6 is a perspective view showing the exterior of an erected bellows embodying the instant invention.
Figure 8:
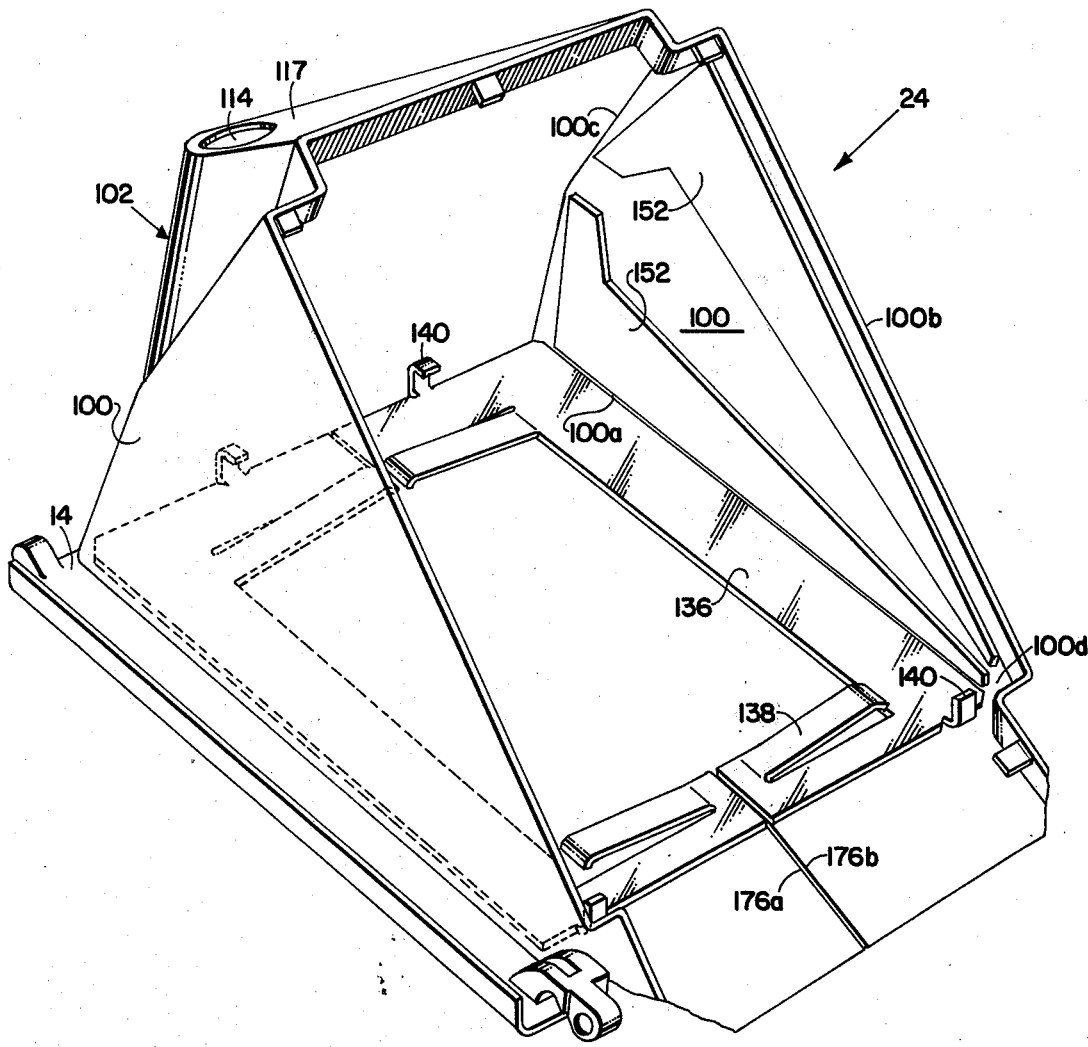
FIG. 8 is a perspective view of the interior of the erected bellows shown in FIG. 6.

As best shown in FIGS. 6 and 8, the erected fabric bellows 24 includes a pair of side walls 100 for enclosing the space between the extended camera housing sections 12 and 14 and a forwardly extending section 102 for enclosing space bounded by housing sections 16 and 18 and the leading edges of bellows side walls 100.

Figure 4:
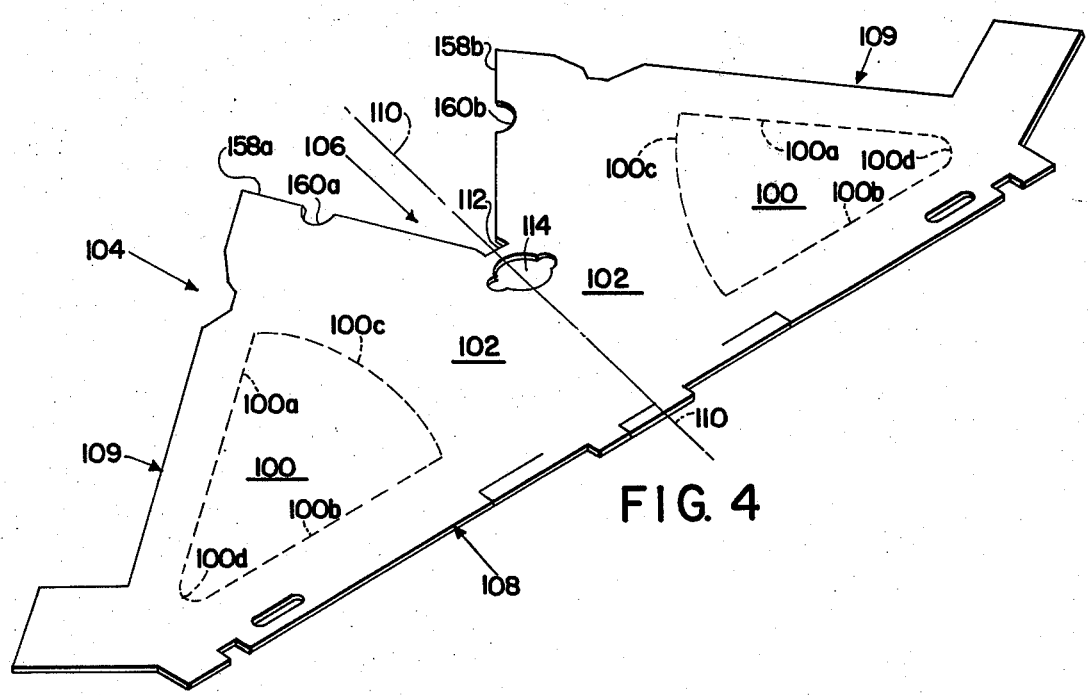
FIGS. 4 and 4a are perspective views of the component parts of a light excluding bellows embodying the instant invention.

FIG. 4 shows the blank 104 of fabric cut to its initial predetermined shape. It generally resembles a truncated triangle having an inverted V-notch 106 at its top side pointing towards a substantially linear base or bottom edge 108. Between the base 108 and the notch 106 are a pair of inwardly inclined side edges 109. At right angles angles to base 108, and passing through its center, is an axis of symmetry 110 that divides blank 104 into mirror image right and left hand sections. Centered on axis 110 just below a truncated apex 112 of notch 106 is an opening 114 that will be positioned behind and in alignment with camera objective lens 52 to allow image-bearing light to pass into the camera chamber 26.

Figure 4A:
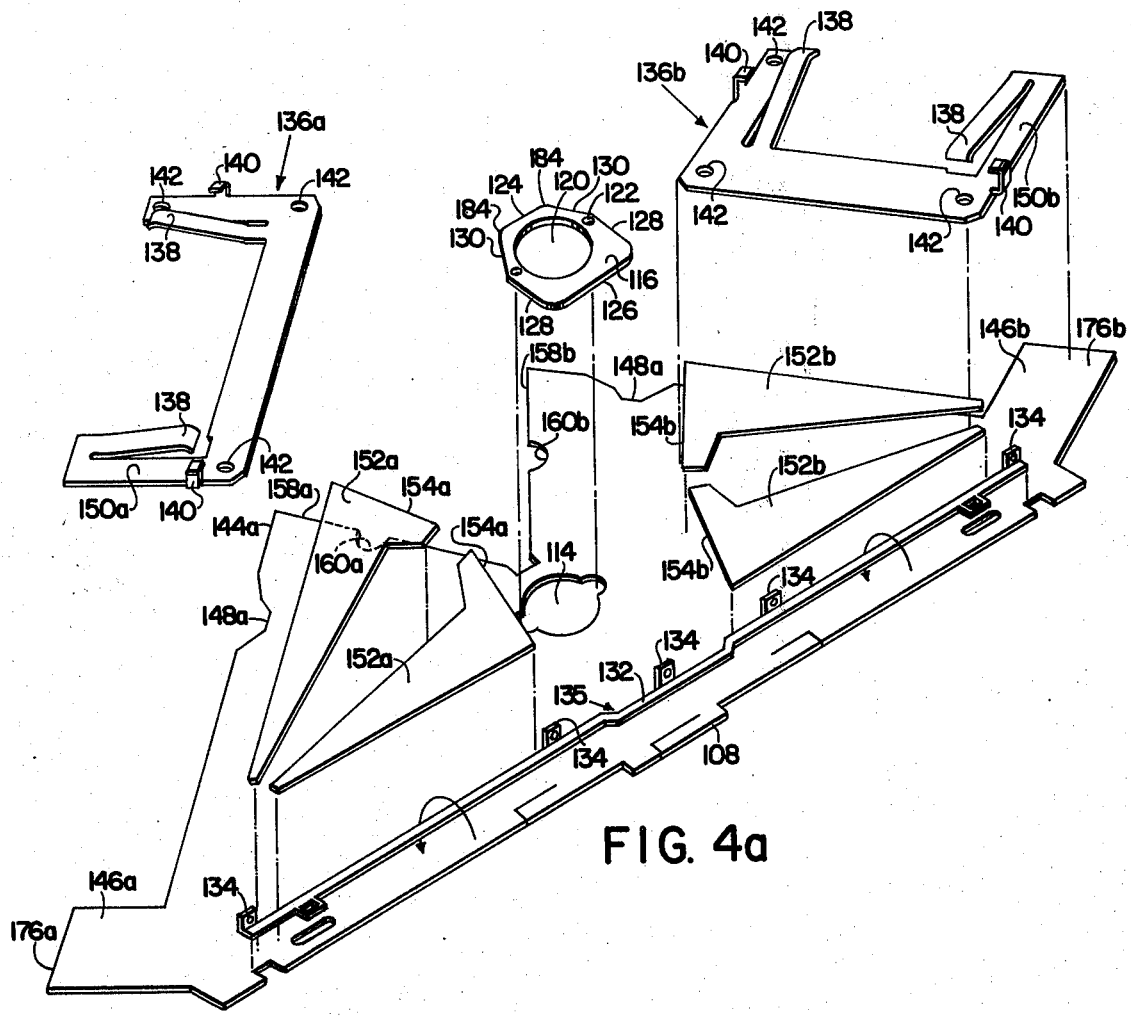

FIG. 4a is a view of blank 104 that will eventually be the interior surface of the assembled fabric bellows 24. In order to more clearly visualize how the fabric bellows 24 is constructed, the left and right hand mirror image and opposed spaced areas of blank 104 that define the bellows side walls 100 are shown in dotted lines as generally wedge shaped areas. That portion of the blank 104 therebetween will define the forwardly extending section 102.

The mirror image, wedge shaped side wall defining areas are located between the bottom edge 108 and the inclined side edges 109 of blank 104. The top, bottom, and leading edges of side wall 100 are designated, respectively, 100a, 100b, and 100c. A trailing end corner of side wall 100, opposite leading edge 100c, is designated 100d. Those portions of blank 104 adjacent to top and bottom edges 100a and 100b, along side edges 109 and bottom edge 108 of blank 104 will be used to mount means for coupling the bellows side walls 100 to camera 10.

The first step in making the fabric bellows 24 from the fabric blank 104 is the attachment of retainers used to couple the assembled bellows of FIGS. 6 and 8 to camera 10. Unless otherwise specified, the retainers, are preferably metal stamping from sheet stock of 0.050 stainless steel or some other suitable material.

As best shown in FIG. 4a, the first retainer 116 secures the leading end 117 of forwardly extending section 102 of bellows 24 to a rear planar wall 118 of camera housing 18. In a preferred embodiment, retainer 116 is a flat, metal six sided flange having a circular opening 120 therein. On opposite sides of opening 120 are a pair of mounting holes 122 through which appropriate fasteners, such as screws or rivets, extend to couple retainer 116 to the rear wall 118 of camera housing 18 with the leading end 117 of bellows held therebetween.

In addition to coupling the leading end 117 of the bellows 24 to camera housing 18, retainer 116, by its shape, establishes fold lines in the flexible fabric of the bellows and eliminates the need for molded, folded lines or creases or separate stiffener to accomplish folding the bellows along predetermined lines in response to folding camera 10.

This function will be described in detail later in the disclosure. It is, however, desirable at this point to numerically designate the outer edges of retainer 116 as parallel upper and lower edges 124 and 126, respectively, side edges 128 extending upwardly and at right angles to bottom edge 126 and inclined edges 130 joining the ends of upper edge 124 with side edges 128.

In a preferred embodiment, retainer 116 is attached to the interior surface of blank 104 with its circular opening 120 in alignment with the lens opening 114 in blank 104. The retainer may be attached with a double sided adhesive tape, a liquid cement, or other suitable bonding agents. When attached, the upper and lower edges 124 and 126 are normal to axis of symmetry 110, side edges 128 are parallel to and symmetrically spaced from axis 110 and inclined edges 130 are disposed at a predetermined angle of intersection with the axis 110.

Figure 5:
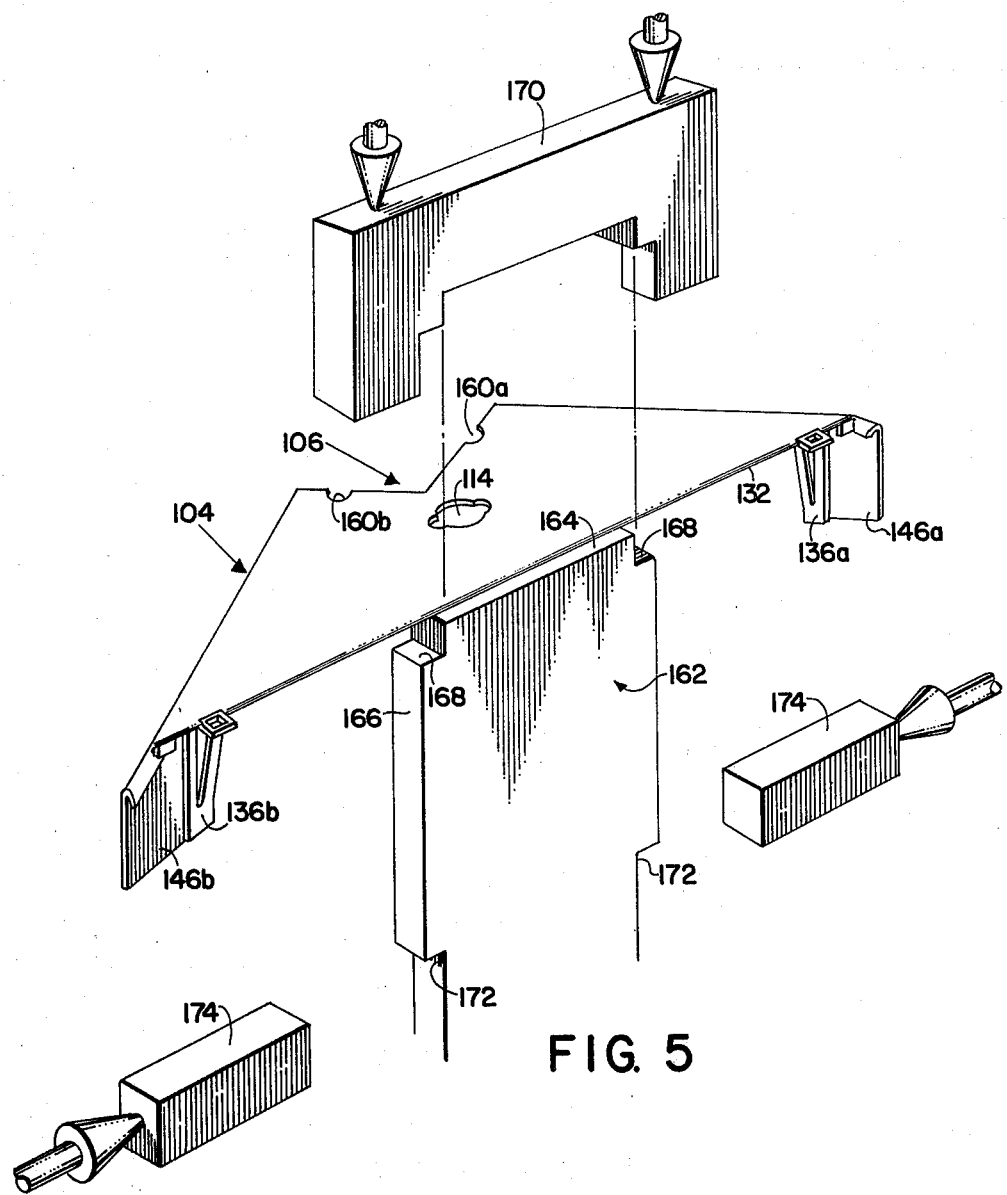
FIG. 5 is a diagrammatic illustration of a die forming process for bending a bellows retainer.

The bottom edge of the assembly bellows 24 of FIGS. 6 and 8 is attached to camera housing section 12 by means of a substantially three sided retainer 132 (see FIG. 8). Initially, retainer 132 is an elongated, flat and thin, metal strip that is attached to the bottom edge 108 of the blank 104. In a later step, diagrammatically shown in FIG. 5, it will be formed into the three sided structure shown in FIG. 8.

Retainer 132 includes a plurality of integrally formed flanges 134, some having holes therein, that serve as points of attachment for coupling retainer 132 to the inner frame of camera housing section 12 after the bellows 24 has been formed. A discontinuity 135 in the middle of retainer 132 is provided to conform to structure within the camera.

Retainer 132 is bonded to the interior surface of blank 104 in the position shown in FIG. 4a and the bottom edge 108 of blank 104 is folded over the retainer 132 and bonded in covering relation thereto. It will be noted that notches, holes and L-shaped slits are provided along edge 108 so that flanges 134 will protrude through the folded over edge 108.

The third flange 136 serves a dual purpose. It is the means for coupling the top edges 100a of bellows side walls 100 to camera housing section 14 and also serves as means for resiliently mounting mirror 56 on the interior surface of housing section 14.

To facilitate assembly of bellows 24, retainer 136 is preferably made in two half sections 136a and 136b. Each half section is a generally U-shaped flange having a pair integrally formed resilient spring arms 138, a pair of opposing integrally formed right and left hand flanges 140 for holding mirror 56 in overlying relation to spring arm 138 and mounting holes 142 through which fasteners are adapted to extend to couple retainer 136 to the interior surface of camera housing section 14.

As best shown in FIGS. 4 and 4a, the side edges 109 of blank 104 include outwardly extending rectangular tab sections 146a and 146b at the bottom of edges 107. Near the top of side edges 107 are a pair of indented shallow notches 148a and 148b serving as fold locations which define the interface between bellows side walls leading edges 100c and the forward section 102.

Retainer halfs 136a and 136b are bonded to the interior surface of blank 104 along side edges 109 below notches 148a and 148b such that the bottom legs 150a and 150b overlie the outwardly extending tab sections 146a and 146b.

The fabric bellows 24 also includes two pairs of side wall leading edge 100c defining members 152. The left hand members 152 are designated 152a and the right hand members 152b. Each edge defining member is generally L-shaped and includes a leading defining edge 154. In a preferred embodiment, each edge defining member 152 is formed of a thin but relatively stiff (less flexible than the fabric of blank 104) plastic, such as Mylar having a nominal thickness of 8 mils, and is bonded to the interior surface of blank 104 in the position shown in FIG. 4a (within the bounds of the dotted line side wall defining areas of FIG. 4).

When bellows 24 is assembled and erected, the edges 154 of members 152 define and support leading edges 100c of side walls 100 at the interface between side walls 100 and forward section 102. As will be explained later, it is important to maintain edges 100c in a predetermined position to insure that there is sufficient clearance between the side walls 100 of the erected bellows and the lateral edges of the camera reflex member 58 to permit reflex member 58 to freely pivot between its viewing and exposure positions about pivot 59.

The inverted V-shaped notch 106 at the top of blank 104 is defined by left and right hand opposing inclined edges 158a and 158b. Each edge 158 includes a rounded mirror image notch 160 (designated 160a and 160b). After the retaining member 132 is formed, edges 158a and 158b will be joined in side-by side abutting relation and the notches 160a and 160b will cooperate to form the viewing device entrance aperture 74.

With the retainers 116, 132, 136a and 136b and edge defining members 152 bonded to the flat blank 104, the bellows 24 is transferred to a die forming machine to form retainer 132 into a three-sided structure of FIG. 8. The die forming process is diagrammatically illustrated in FIG. 5 of the drawings.

A form 162 includes a top planar surface 164 and a pair of side surfaces 166. The transition between surfaces 164 and 166 includes a pair of right angle relief sections 168.

Retainer 132 is centered on surface 164 and a conforming die piece 170 is hydraulically driven downwardly over form 162 to bend retainer 132 into a shape conforming with surfaces 164 and 166 and relief sections 168. The lateral sides of retainer 132 now extend along surfaces 166 and below a pair of lower right angle relief sections 172 on form 162. The trailing ends of the lateral sides are then hydraulically formed by lateral die members 174.

The formed shape of retainer 132 is best shown in FIG. 8 of the drawings. The right angle indentations formed by relief sections 168 and 172 are provided to conform to structure in camera housing section 12 where retainer 132 is attached thereto.

Once the retainer 132 has been formed, the fabric bellows is completed by adhesively taping a leading end seam defined by the inverted V-notch edges 158a and 158b and a trailing edge seam defined by the outermost edges 176a and 176b of tab sections 146a and 146b. As noted earlier, the rounded mirror image notches 160a and 160b cooperate, when the leading end seam is taped together to form the entrance pupil aperture 74 for camera viewing device 64.

The assembled fabric bellows 24 is attached to the camera 10 by means of the three retainers. Retainer 116 couples the leading end 117 of forward section 102 to the rear wall 118. The lower periphery of the bellows is secured to the support plate 40 by means of the flanges 134 on retainer 132. The upper inwardly turned edges 100a of the bellows side walls 100 are secured to the interior surface of housing section 14 by means of retainer 136 which also resiliently mounts mirror 56.

The camera mounted erected bellows is shown in FIGS. 1 and 3 of the drawings. It will be noted that edge defining members 152 define and maintain a smooth and curved leading edge 100c of each of the erected planar side walls 100 thus providing clearance for the pivotal motion, therebetween, of reflex member 58.

FIG. 3 shows that the portion of forward section 102 that includes the viewing device entrance pupil 74 is not attached to the camera housing section 16. This arrangement permits the camera 10 and bellows 24 to be folded to the position of FIG. 2. It will be noted that the fabric is somewhat slack at this point. This permits the bellows to be folded flat without stretching the fabric. An excess or fold 178 of cloth is provided at the bottom of the forwardly extending portion 102 for the same purpose. While fold 178 does extend into camera chamber 26, it does not intrude in the optical path.

Figure 9:
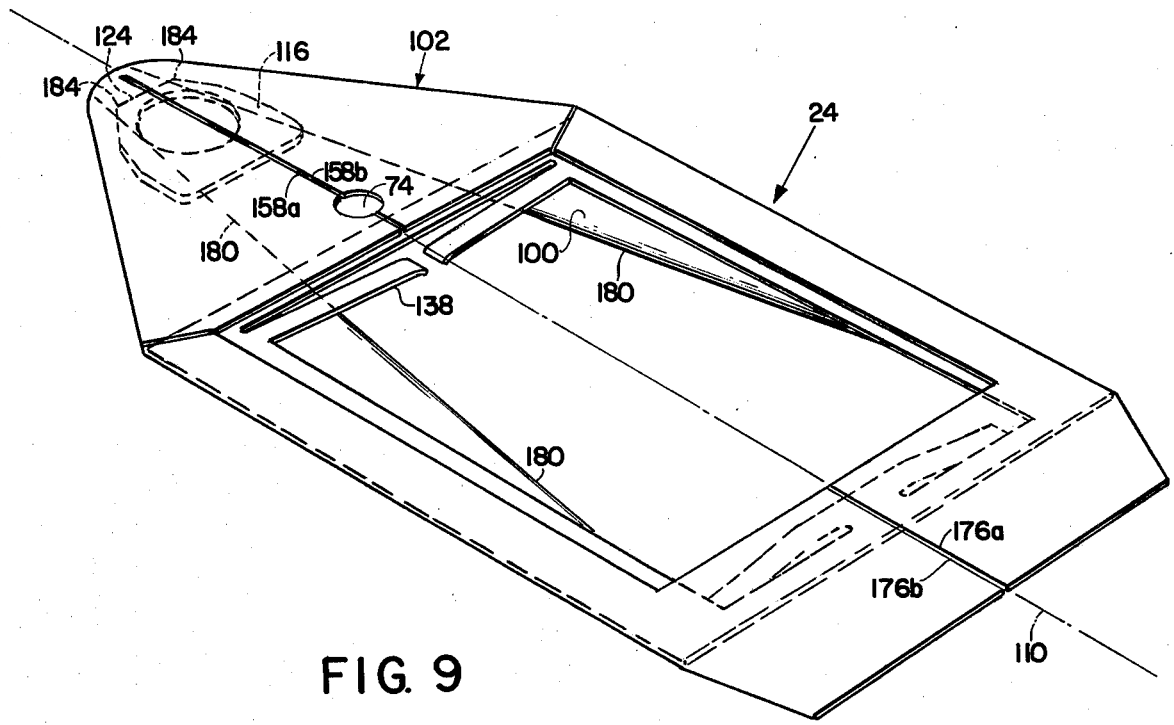
FIG. 9 is a perspective view of the bellows shown in its collapsed configuration.
Figure 10:
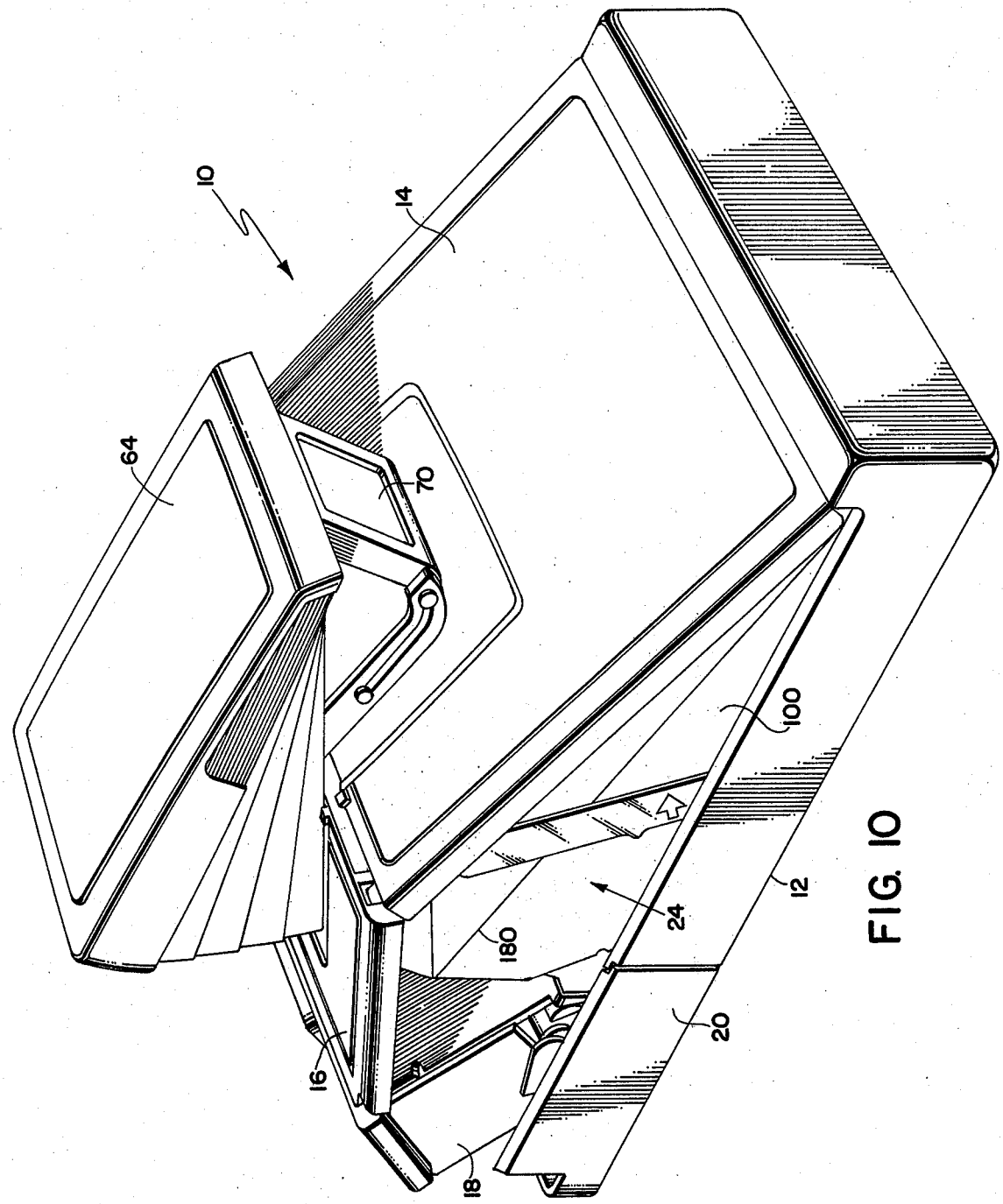
FIG. 10 is a perspective view of the camera, in a partially folded state, to illustrate the fold lines along the sides of the bellows which are established in response to moving the camera from the extended position of FIG. 1 to the folded position of FIG. 2.

As camera 10 is moved from the extended position towards the folded position, the bellows 24 automatically begins to assume its folded or collapsed configuration (shown in FIG. 9 of the drawings). As best shown in FIG. 10, the sides of the bellows fold inwardly, accordian style, along single fold lines 180 extending from the trailing end, and laterally spaced corners 100d of side walls 100 forwardly and inwardly along side walls 100 through the approximate mid-point of forward section 102 to the corners 184 of bellows retainer 116.

Figure 7:
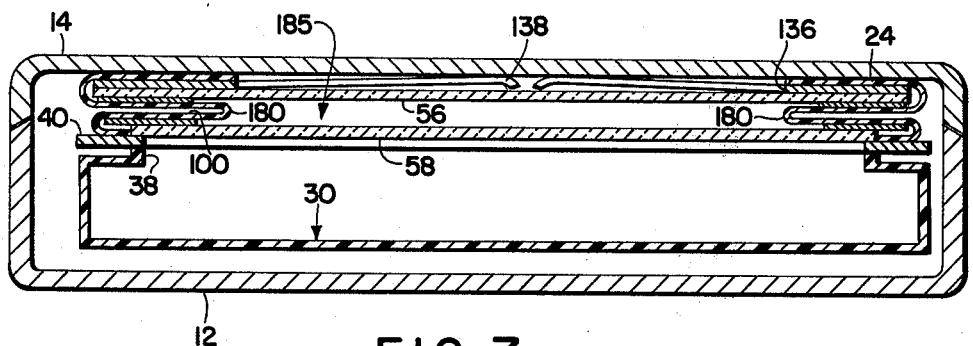
FIG. 7 is a cross-sectional view of the folded camera taken along lines 7—7 of FIG. 2.

As best shown in FIG. 2, housing sections 14 and 16 are located in overlying relation to housing sections 12 and 20 when the camera is folded. It is between these opposing upper and lower housing sections that the collapsed bellows shown in FIG. 9 is stored. As best shown in FIG. 7, the inwardly folded side walls 100 (folded once along lines 180) occupies a space 185 between the resiliently mounted mirror 56 supported by bellows retainer 136. As the camera 10 is closed, the two layers of fabric and edge defining member 152 (folded side walls 110) cause the resiliently mounted mirror 56 to move against the bias of spring arms 138 thereby moving mirror 56 closer to the interior surface of housing section 14 than the operative position of mirror 56 shown in FIG. 3. In this manner, adequate storage space 185 is provided without putting pressure on the reflex member 58 or mirror 56. Such pressure may cause distortion to either one of these optical components. When the folded bellows is erected, spring arms 138 urge mirror 56 forwardly to its operative position of FIG. 3 against stop flanges 140.

It will be noted that even though the bellows 24 is formed of a flexible fabric, it reliably folds along fold lines 180 without having permanent creases or molded fold lines in the sides of the bellows. Also, while each fold line 180 passes between a pair of opposing edge defining members 152, these edge defining members 152 do not serve to establish the fold lines.

The fold lines 180 are established by inducing a slight tension in the sides of the fabric bellows along predetermined lines 180 in response to moving the extended camera 10 towards its folded position. The tension induces the inward accordian fold. Once the tension or fold lines are established, it is the compressive force on the upper and lower edges of the fabric bellows applied by the camera housing sections moving towards one another that do the actual folding.

From FIG. 9, it will be noted that the bellows 24 is symmetrical with dotted line 110. When erected, as in FIGS. 6 and 8, the bellows is symmetrical with respect to an imaginary plane of symmetry which bisects the bellows longitudinally along the center line seams, formed by abutting edges 158a and 158b and abutting edges 176a and 176b, and bisects aperture 74 and leading end opening 114, said plane of symmetry also being normal to a plane containing the bottom peripheral edges of the bellows defined by formed retainer 132.

When attached to camera 10, the plane of symmetry of the erected bellows coincides with a plane of symmetry of the camera's optical system. In FIG. 3, the camera optical path is diagrammatically illustrated as a dotted line showing the path followed by a light ray passing through the optical center of objective lens 54. This dotted line is in the vertical plane of symmetry of the camera's optical system, said vertical plane being substantially normal to a horizontal plane container the plate-like reflex member 58.

As camera 10 is moved from the erected position of FIGS. 1 and 3 to the folded position of FIG. 2, housing sections 18, 16 and 14 move as a single unit. Housing section 18 pivots about pivot 19 in a counterclockwise direction (as viewed in FIG. 3) and moves into housing section 20 in front of rollers 82 and 84. Baffle plate 85 is pivotally mounted and is depressed by housing section 18 to a position parallel to the bottom wall of housing section 20.

The counterclockwise movement of housing section 18 causes housing section 16 to pivot in a clockwise direction about pivot 15 and housing section 14 to pivot downwardly in a counterclockwise direction about pivot 13.

When camera 10 is fully extended, the distance between camera pivots 13 and 17 (or the top edge of camera housing 18) is at a minimum in the coinciding planes of symmetry of the bellows 24 and the optical system. As the camera is folded, and housing section 18 pivots about pivot 19, the distance between pivots 13 and 17 increases until it reaches a maximum when housing section 18 is in its final folded position.

By attaching the leading end 117 of bellows forward section 102 to the rear wall 118 of camera housing section 18 with retainer 116, the increase in distance between pivots 13 and 17, as the camera is folded, is exploited to direct tension along lines 180 to cause the accordian type fold.

More specifically, it will be noted that the top horizontal and planar edge 124 of retainer 116 is closest to pivot point 17 and is normal or transverse to the planes of symmetry passing through its midpoint. Therefore, the distance increase between edge 124 and pivot 13 is greater than the distance increase between the lower horizontal edge 126 and pivot 13. Rather than describe the relation of retainer 116 with respect to pivot point 13, it will be more beneficial to think of the relationship of retainer 116 with respect to the trailing end corners 100d of bellows side walls 100 which are located just forwardly of pivot point 13.

Since the top edge 124 of retainer 116 is closest to pivot 17, the fold lines or tension lines 180 will be induced in straight lines from edge 124 to the trailing end corners 100d. The upwardly inclined angle of lines 180 with respect to the bottom edges 100b of bellows side walls 100 bears a direct relationship to the proximity of upper edge 124 and pivot 17. Thus, one may control the elevation of lines 180, with respect to the bottom edges 100b by controlling the spacing between pivot 17 and the upper edge 124 of retainer 116.

The inward inclination or angle of lines 180 with respect to the vertical plane of symmetry is controlled by the length of the upper edge 124 as measured between the upper corners 184 of retainer 116 at the intersection of edge 124 and edges 130. Thus, the fold lines 180 are established between the trailing end corners 100d of side walls 100 and the upper corners 184 of retainer 116.

When bellows 24 is erected, the top and bottom retainers 136 and 132 induce a slight tension on side walls 100 to maintain them in their substantially planar and vertical configuration. The leading end section 102 is shaped by the retainer 116 and taut leading edges 100c of the bellows side walls 100, said edges 100c being sharply defined and maintained in the vertical plane of the erected side walls 100 by the defining edges 154 of members 152. Thus, the fabric along the sides of the erected bellows 24 is deployed outboard of the direct straight lines between corners 184 of retainer 116 and the trailing end corners 100c of the bellows side walls 100.

As the camera 10 is folded, the distance between corners 184 and 100c increases, thereby inducing tension and pulling the outboard of fabric in towards the direct lines between corners 184 and 100c to establish the accordian fold as shown in FIG. 10.

While the fold lines 180 are established by tension, the actual folding of bellows 24 is done by the housing section 12 and 14 which apply a collapsing compressive force to the top and bottom edges of the bellows 24 through retainers 132 and 136 to cause the sides to fold inwardly towards the plane of symmetry.

Erection of the camera 10 and bellows 24 is accomplished by reversing the procedure just described.

In summary, a folding camera has been provided which includes a novel, low cost, fabric bellows.

The bellows is characterized by the fact that while it has a complex shape when erected, it may be fabricated from a flat, single, low cost, pre-shaped blank of flexible light-opaque material. Also, the bellows has no molded or permanent crease fold lines. The fold lines are established by a bellows retainer which directs tension forces applied to the bellows by the folding housing sections of the camera along predetermined lines.

In the illustrated embodiment, the fabric was described as a rubber impregnated or coated cloth. It will be understood that other materials, such as thin flexible plastics, may be used.

The bellows includes certain retainers and edge defining members which were bonded to a precut blank of starting material. It is within the scope of the present invention to form the retainers and edge defining members integrally with the starting blank, for example, one may choose to make an all plastic bellows having the retainers and edge defining members integrally molded with the pre-shaped blank.

Since certain changes may be made in the above system and apparatus without departing from the scope of the invention herein involved, it is intended that all matter contained in the above description or shown in the accompanying drawings shall be interpreted as illustrative and not in a limiting sense.

What is claimed is:

1. A folding camera comprising:
   a housing including at least first and second housing sections mounted for relative movement between a compact folded position and an extended position wherein said first and second housing sections define a space therebetween;
   optical means for transmitting image-bearing light along an optical path in said space, when said first and second housing sections are located in said extended position;
   a collapsible and erectable bellows formed of a flexible, light-opaque material, said bellows being coupled to said first and second housing sections for movement therewith between a compact collapsed position when said first and second housing sections are in said folded position and an erected position, when said first and second housing sections are in said extended position, wherein said erected bellows defines light blocking walls in said space for excluding extraneous light from said optical path;
   said bellows and said first and second housing sections being operatively associated such that said first and second housing sections apply tension forces to said erected bellows in response to moving said first and second housing sections from said extended position towards said folded position; and
   means for directing said tension forces along predetermined lines of said walls defined by said erected bellows to establish fold lines along which said walls fold to assume said collapsed position of said bellows as said first and second housing sections move toward said folded position.

2. A folding camera as defined in claim 1 wherein said means for directing said tension forces includes means for coupling said bellows to said second housing section.

3. A folding camera as defined in claim 1 further including means in said first housing section for supporting a film unit in position for exposure and wherein said optical means includes an objective lens mounted on said second housing section for transmitting image-bearing light along said optical path to expose a film unit located at said exposure position and wherein said bellows includes a leading end having an opening therein through which light from said objective lens is adapted to pass as said light follows said optical path, said leading end of said bellows being adapted to be coupled to said second housing section with said opening in operative association with said objective lens and said means for directing said tension forces including means for coupling said leading end of said bellows to said second housing section.

4. A folding camera as defined in claim 3 wherein said coupling means includes a retaining plate having a predetermined shape, said retaining plate being coupled to said second housing section, with said leading end of said bellows positioned between said retaining plate and said second housing section, said plate, by its said predetermined shape, having locations thereon which selectively direct said tension forces along said predetermined lines.

5. A folding camera as defined in claim 1 wherein said bellows has a shape that is symmetrical with respect to a plane about which said optical path is symmetrical and said means for directing said tension forces includes means for directing said tension forces along at least two lines that are symmetrically disposed with respect to said plane such that said walls defined by said erected bellows fold inwardly towards said plane in response to moving said first and second housing sections from said extended position towards said folded position.

6. A folding camera as defined in claim 1 wherein said bellows is formed from a single, flat, pre-shaped blank of said flexible, light-opaque material and said means for directing said tension forces includes means for coupling said bellows to one of said first and second housing sections.

7. A folding camera as defined in claim 6 wherein said means for directing said tension forces includes means for coupling said bellows to said second housing section.

8. A folding camera as defined in claim 1 wherein said first housing section includes leading and trailing ends and said second housing section is pivotally coupled to said first housing section near its leading end for movement between said extended position wherein said second housing section is angularly disposed with respect to said first housing section and said folded position wherein said second housing section assumes a substantially end-to-end relation with said first housing section.

9. A folding camera as defined in claim 1 further including means for applying a compressive force to said bellows as said first and second housing sections move from said extended position towards said folded position to fold said bellows along said predetermined fold lines established by said directed tension forces.

10. A folding camera as defined in claim 9 wherein said means for applying said compressive force includes a third camera housing section coupled to said bellows and said first housing section, near said trailing end thereof, for movement between said folded and extended positions of said camera housing.

11. A folding camera as defined in claim 10 further including a fourth housing section coupled to said second and third housing sections for movement therewith between said folded and extended positions, said first, second, third, and fourth housing sections being pivotally interconnected to form a four-bar linkage.

12. A folding camera as defined in claim 1 wherein said bellows is formed of a single, flat, pre-shaped blank of said flexible, light-opaque material.

13. A folding camera as defined in claim 12 wherein said flexible, light-opaque material includes a woven fabric.

14. A folding camera as defined in claim 13 wherein said woven fabric is coated with a light-opaque substance.

15. A folding camera comprising:
housing including first and second housing sections coupled together for movement between a compact folded position wherein said first and second housing sections are in overlying face-to-face relation, and an extended position wherein said first and second housing sections define a space therebetween;
means within said first housing section for locating a film unit in position for exposure;
a mirror adapted to be located in operative position in said space at a fixed distance from said second housing section for directing light along an optical path towards a film unit located at said exposure position when said first and second housing sections are in said extended position;
a collapsible and erectable bellows coupled to said first and second housing sections for movement therewith between a collapsed position wherein said bellows is stored between said folded first and second housing sections along with said mirror and an erected position wherein said bellows defines light-blocking walls in said space to exclude extraneous light from the optical path; and
means mounting said mirror for movement from said operative position to an inoperative position, closer to said second housing section than said fixed distance, so as to provide sufficient storage space for said collapsed bellows when said first and second housing sections are located in said folded position.

16. A folding camera as defined in claim 15 wherein said means mounting said mirror for movement includes biasing means for urging said mirror from said inoperative position towards said operative position and stop means against which said biasing means urges said mirror for locating said mirror in said operative position.

17. A folding camera as defined in claim 16 further including means for coupling said bellows to said second housing section and wherein said biasing and stop means are integrally formed with said coupling means.

18. A folding camera as defined in claim 15 further including a reflex member coupled to said first housing section for movement between a first position wherein said reflex member is located in overlying relationship to said means for locating a film unit in position for exposure for receiving light from said mirror and a second position wherein said reflex member is adjacent to and substantially parallel with said mirror located in said operative position, said bellows being configured to assume its said collapsed position wherein said bellows is stored between said mirror and said reflex member when said first and second housing sections are located in said folded position.

19. A folding camera comprising:
a housing including first, second, third, and fourth housing sections interconnected as a four-bar linkage for movement between a compact folded position and an extended position wherein said housing sections define a space therebetween, said second and third housing sections being pivotally coupled to said first housing section near opposite ends thereof and said fourth housing section being coupled between ends of said second and third housing sections;
means in said first housing section for locating a film unit in position for exposure;
exposure means including optical means for exposing a film unit located at said exposure position, said optical means including an objective lens mounted on said second housing section for transmitting image-bearing light along an optical path in said space between said extended housing sections, and a mirror mounted on said third housing section in said optical path for directing the light along an extension of said optical path in said space towards a film unit located at said exposure position;
a collapsible and erectable bellows formed of a flexible, light-opaque material cooperating with said first, second, and third extended housing sections for excluding extraneous light from said optical path in said space, said bellows being coupled to said first, second and third housing sections for movement therewith between a collapsed position when said first, second, third, and fourth housing sections are in said folded position and an erected position wherein said bellows defines a pair of substantially planar and parallel spaced side walls extending between said first and third housing sections, each of said side walls having a leading edge, and a forwardly extending portion of the bellows enclosing that portion of the optical path between said leading edges of said bellows side walls and said objective lens mounted on said second housing section;
said bellows being configured such that said first and second housing sections apply tension forces to said bellows along said forwardly extending portion and said side walls in response to moving said first, second, third, and fourth housing sections from said extended position towards said folded position; and
means for directing said tension forces along predetermined lines of said forwardly extending portion and said side walls of said erected bellows to establish fold lines along which said bellows folds to assume its collapsed position as said first, second, third, and fourth housing sections move toward said folded position.

20. A folding camera as defined in claim 19 wherein said forwardly extending portion of said bellows includes a leading end having an opening therein through which image-bearing light from said objective lens is adapted to pass as said light follows said optical path, said leading end of said forwardly extending portion of said bellows being adapted to be coupled to said second housing section with said bellows opening in operative association with said objective lens and said means for directing said tension forces including a retaining plate having a predetermined shape, said retaining plate being coupled to said second housing section, around said objective lens, with said leading end of said bellows positioned between retaining plate and said second housing section, and said retaining plate, by its predetermined shape, having locations thereon which selectively direct said tension forces along said predetermined lines.

21. A folding camera as defined in claim 20 wherein said erected bellows has a shape that is symmetrical with respect to a plane of symmetry of said optical path, and said retaining plate includes a tension directing edge symmetrically and transversely disposed with respect to said plane of symmetry for directing said tension forces along two lines that are symmetrically disposed with respect to said plane of symmetry such that said bellows side walls and said forwardly extending portion fold inwardly along said two lines towards said plane of symmetry in response to moving said first, second, third, and fourth housing sections from said extended position towards said folded position.

22. A folding camera as defined in claim 21 wherein the length of said tension directing edge defines the inward angle of said predetermined lines with respect to said plane of symmetry.

23. A folding camera as defined in claim 20 wherein the location of said tension directing edge with respect to interconnection of said second and fourth housing sections defines the angle of said lines with respect to bottom and top edges of said bellows side walls, coupled respectively, to said first and third housing sections.

24. A folding camera as defined in claim 19 wherein said bellows is formed from a single, flat, pre-shaped blank of said flexible, light-opaque material and said means for directing said tension forces includes a retaining plate for coupling said forwardly extending portion of said bellows to said second housing section.

25. A folding camera as defined in claim 24 wherein said flexible, light-opaque material includes a woven fabric.

26. A folding camera as defined in claim 25 wherein said woven fabric is coated with a light-opaque substance.

27. A folding camera as defined in claim 19 wherein said optical means further includes a reflex member having lateral edges, said reflex member being coupled to said first housing section for movement in said space between first and second operative positions, said lateral edges of said reflex member being disposed in close proximity to said erected side walls of said bellows for movement in a direction that is substantially parallel to said erected side walls, and said bellows further including edge defining panels, said panels being less flexible than said flexible material, mounted on said side walls, for defining said leading edges of side walls and maintaining said leading edges out of the path of travel of lateral edges of said reflex member to prevent contact therebetween as said reflex member moves between its said first and second position.

28. A folding camera as defined in claim 27 wherein said first and third housing sections are located in overlying face-to-face relation when said camera is folded and a portion of said collapsed bellows is adapted to be stored between said mirror mounted in said third housing section and said reflex member mounted in said first housing section, said camera further including means mounting said mirror on said third housing section for movement between an operative position wherein said mirror is spaced from said third housing section at a given distance to locate said mirror in said optical path when said camera is extended and an inoperative position, closer to said third housing section, when said camera is folded, to provide sufficient storage space between said mirror and said reflex member for said portion of said bellows.

29. A folding camera as defined in claim 28 wherein said means mounting said mirror for movement includes stop means against which said mirror bears to locate said mirror in said operative position and biasing means for urging said mirror from said inoperative position towards said operative position.

30. A folding camera as defined in claim 29 further including a retaining plate for coupling top edges of said bellows side walls to said third housing section and wherein said stop means and biasing means are integrally formed with said retaining plate.

31. A folding camera as defined in claim 19 wherein said optical means includes a viewing device mounted on said fourth housing section and said bellows includes an aperture in said forwardly extended portion thereof through which image-bearing light following an extension of said optical path follows is adapted to pass for transmission to said viewing device.

32. A folding camera as defined in claim 31 wherein said bellows is formed from a single, flat, pre-shaped blank of said flexible material, said blank having a pair of opposing edges that are adapted to be joined to form a seam in said forwardly extending portion of said bellows, each of said opposing edges having opposing notches therein which cooperate, when said seam is formed, to form said aperture through which said image-bearing light is transmitted to said viewing device.

33. A collapsible and erectable bellows for enclosing a predetermined space in an extended folding camera, said bellows being of the type including, when erected, a pair of parallel spaced side walls and a forward section extending between and forwardly of said side walls, said forward section including a leading end having a first opening therein adapted to be located in operative relation with the camera's objective lens and through which light from the lens is transmitted into the predetermined space and a second opening in the forward section intermediate the leading end and the side walls through which light is transmitted to a camera mounted viewing device, said bellows comprising:

a single, flat, blank of flexible, light-opaque material, said blank having an axis of symmetry and being of a predetermined shape to include a pair of mirror image areas of said blank defining said bellows side walls, said side wall defining areas being spaced from each other on opposite sides of said axis of symmetry, and a forward section defining area intermediate said side wall defining areas, said forward section defining area including said first opening, and a pair of edges defining a V-shaped notch symmetrical with said axis, said pair of edges including mirror-image notches, said pair of edges being adapted to be located in side-by-side relation when said flexible blank is folded to define the bellow's forward section and side walls and wherein said pair of notches cooperate with each other to form the second opening in the forward section of said bellows.

34. A bellows as defined in claim 33 wherein said flexible material includes a woven fabric.

35. A bellows as defined in claim 34 wherein said woven fabric is coated with a light-opaque substance.

36. A collapsible and erectable bellows for use with a folding camera of the type having a housing comprising first, second, third, and fourth housing sections interconnected as a four-bar linkage for movement between a compact folded position and an extended position wherein the four housing sections are spaced from one another to define a space therebetween, means in the first housing section for locating a film unit in position for exposure, and exposure means including optical means for exposing the film unit, the optical means including an objective lens for transmitting image-bearing light along an optical path in the space, and a mirror adapted to be positioned adjacent the third housing section for directing the light along an extension of the optical path towards a film unit located at the exposure position, and viewing means including a movable reflex member having lateral edges mounted in the first housing for movement between viewing position in overlying relation to a film unit at the exposure position for receiving light from the mirror and directing the light along yet another extension of the optical path to a viewing device mounted on the fourth camera housing section, said bellows comprising:

a single, flat, pre-shaped blank of flexible, light-opaque material, said blank having the general shape of a truncated triangle defined by a base edge, a pair of inwardly inclined and opposite side edges and a top edge that is substantially parallel to said base edge, said blank having an axis of symmetry that is substantially normal to said base edge and said blank having edges defining an inverted V-shaped notch on said axis extending from said top edge towards said base edge, said notch having its apex closest to said base edge;

said blank including spaced mirror-image areas thereof, disposed on opposite sides of said axis, and intermediate said base and inclined side edges, for defining side walls of said bellows which are adapted to enclose the space between the extended first and third housing sections of the camera, each of said side walls including a top edge adapted to be coupled to the third housing section, a bottom edge adapted to be coupled to the first housing section, and a leading edge;

said blank further including another area thereof for defining a forward section of said bellows that extends forwardly from said leading edges of said bellows side walls to said second housing section for enclosing that portion of the optical path from the objective lens rearwardly to said leading edges of the bellows side walls, said forward section defining area being intermediate said pair of side wall defining areas and being symmetrical said axis of symmetry;

said forward section defining area having an opening therein on said axis, said opening being adapted to be located in operative association with the camera lens on the second housing section for transmitting light from the lens along the optical path into the space;

said forward section defining area also including said opposing edges defining said V-shaped notch, each of said edges having mirror-image notches therein, said opposing edges being adapted to be brought into mating side-by-side relation to form said forward section of said bellows, and wherein said mirror-image notches therein cooperate with each other to form an aperture through which light is directed from said space to the camera mounted viewing device;

means for coupling said forward section of said bellows to the second housing section with the opening therein in alignment with the lens; and means for coupling the bottom and top edges of bellows side walls, respectively to the first and third camera housing sections.

37. A bellows as defined in claim 36 wherein said blank is formed of a woven fabric.

38. A bellows as defined in claim 37 wherein said woven fabric is coated with a light-opaque rubber.

39. A collapsible and erectable bellows for use with a folding camera of the type having a housing comprising first, second, third, and fourth housing sections interconnected as a four-bar linkage for movement between a compact folded position and an extended position wherein the four housing sections are spaced from one another to define a space therebetween, means in the first housing section for locating a film unit in position for exposure, and exposure means including optical means for exposing the film unit, the optical means including an objective lens for transmitting image-bearing light along an optical path in the space, and a mirror adapted to be positioned adjacent the third housing section for directing the light along an extension of the optical path towards a film unit located at the exposure position, and viewing means including a movable reflex member having lateral edges mounted in the first housing for movement between viewing position in overlying relation to a film unit at the exposure position for receiving light from the mirror and directing the light along yet another extension of the optical path to a viewing device mounted on the fourth camera housing section, said bellows comprising:

a single, flat, pre-shaped blank of flexible, light-opaque material, said blank having the general shape of a truncated triangle defined by a base edge, a pair of inwardly inclined and opposite side edges and a top edge that is substantially parallel to said base edge, said blank having an axis of symmetry that is substantially normal to said base edge, and said blank having edges defining an inverted V-shaped notch on said axis extending from said top edge towards said base edge, said notch having its apex closest to said base edge;

said blank including spaced mirror-image areas thereof, disposed on opposite sides of said axis, and intermediate said base and inclined side edges, for defining side walls of said bellows which are adapted to enclose the space between the extended first and third housing sections of the camera, each of said side walls including a top edge adapted to be coupled to the third housing section, a bottom edge adapted to be coupled to the first housing section, and a leading edge;

said blank further including another area thereof for defining a forward section of said bellows that extends forwardly from said leading edges of said bellows side walls to said second housing section for enclosing that portion of the optical path from the objective lens rearwardly to said leading edges of the bellows side walls, said forward section defining area being intermediate said pair of side wall defining areas and being symmetrical with said axis of symmetry;

said forward section defining area having an opening therein on said axis, said opening being adapted to be located in operative association with the camera lens on the second housing section for transmitting light from the lens along the optical path into the space;

said forward section defining area also including said opposing edges defining said V-shaped notch, each of said edges having mirror-image notches therein, said opposing edges being adapted to be brought into mating side-by-side relation to form said forward section of said bellows, and wherein said mirror-image notches therein cooperate with each other to form an aperture through which light is directed from said space to the camera mounted viewing device;

means for coupling said forward section of said bellows to the second housing section with the opening therein in alignment with the lens, said means for coupling said forward section of said bellows to the second housing section including a retaining plate having an edge that is symmetrical with and substantially normal to said axis of symmetry, said edge serving to direct tension forces induced in said bellows by the first and second housing sections of the camera as they move towards the folded position, along predetermined lines of said bellows forward section and side walls for establishing fold lines along which said bellows folds to assume its said collapsed position; and means for coupling the bottom and top edges of bellows side walls, respectively to the first and third camera housing sections.

* * * * *